Dec. 15, 1942.    R. S. THACKER    2,305,042
IMPACT WELDING
Filed May 28, 1940    4 Sheets-Sheet 1

INVENTOR
Ralph S. Thacker
BY John Flam
ATTORNEY

Dec. 15, 1942.  R. S. THACKER  2,305,042
IMPACT WELDING
Filed May 28, 1940   4 Sheets-Sheet 2

INVENTOR
Ralph S. Thacker
BY John Flam
ATTORNEY

Dec. 15, 1942.  R. S. THACKER  2,305,042

IMPACT WELDING

Filed May 28, 1940  4 Sheets-Sheet 3

INVENTOR
Ralph S. Thacker
BY John Flam
ATTORNEY

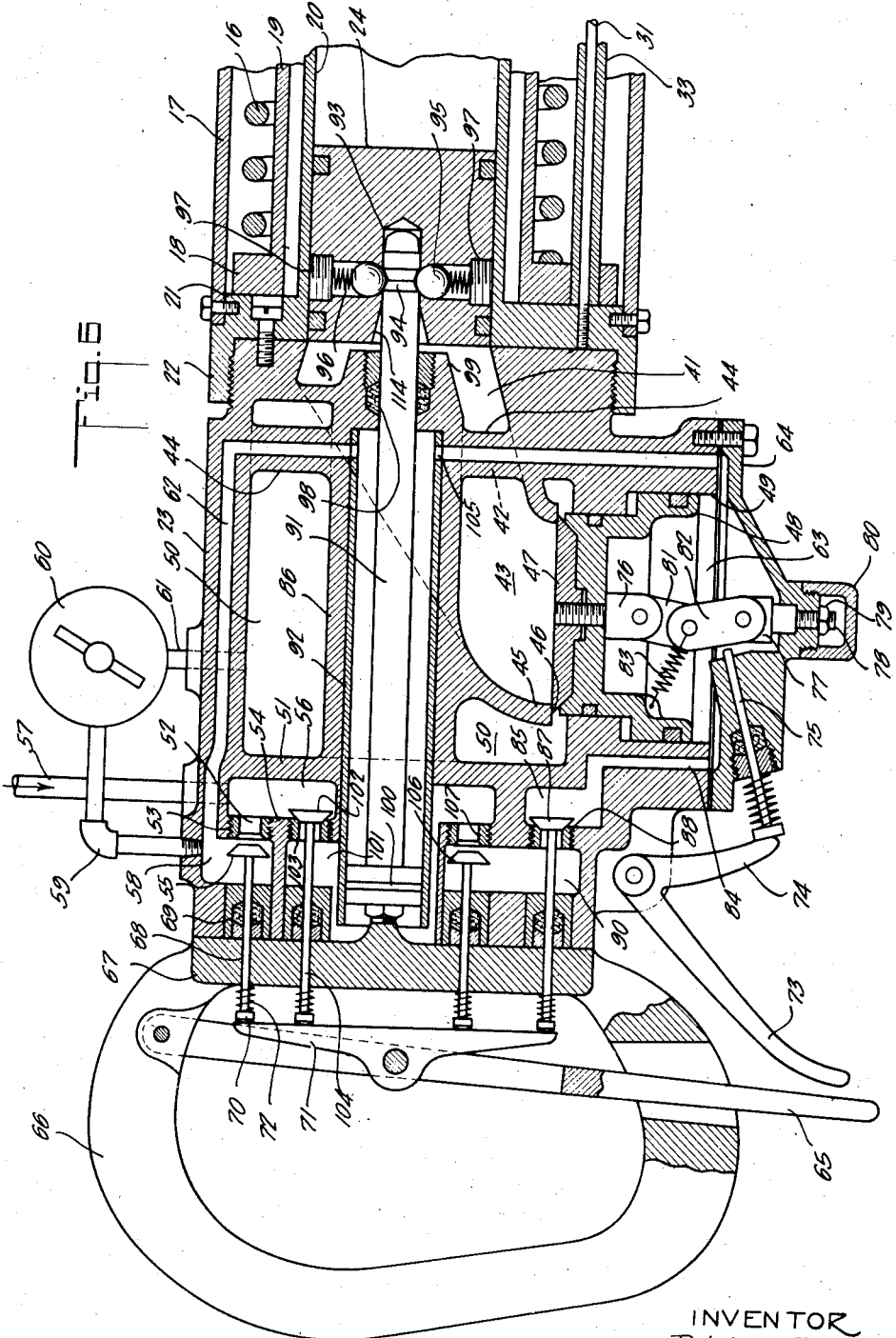

Patented Dec. 15, 1942

2,305,042

UNITED STATES PATENT OFFICE 2,305,042

IMPACT WELDING

Ralph S. Thacker, West Los Angeles, Calif., assignor to Leo M. Harvey, La Canada, Calif.

Application May 28, 1940, Serial No. 337,638

5 Claims. (Cl. 219—10)

This invention relates to the art of welding, and particularly to one in which the parts to be welded together are subjected to a forging pressure.

In general the art of joining two metals together while they are heated to a plastic condition by forging or hammering is old; but the equipment required for this old process is cumbersome and heavy, and the operation is necessarily slow.

It is one of the objects of this invention to make it possible rapidly to produce such welds with simple apparatus, either stationary or portable, and without the exercise of any uncommon degree of skill.

It is another object of this invention to make it possible to utilize electrical energy for heating those portions of the pieces of metal which are to be welded together; and particularly by the passage of current between the pieces.

In order to attain these objects, a particular cycle of operations is provided, which is initiated at will by the operator, and which can be repeated in rapid succession as often as required. This cycle includes the step of first applying a moderate pressure between the pieces to be welded, so as to ensure continuity in the path for the heating current to be passed through the contacting surfaces, and of such order that the current encounters sufficient resistance rapidly to cause the pieces in the vicinity of the pressure application to become plastic or molten.

After this pressure is attained, the pieces are heated by the passage of an electric heating current, and simultaneously the pressure is increased. This causes more intimate contact between the pieces, and a consequent decrease of resistance causing a tapering off of the heating.

Then the heating current is disconnected and the pressure is yet maintained or increased even after the current flow ceases. The adjoining parts are then forced together during the period that the plastic areas congeal.

If it be desired to obtain a more severe mechanical working for securing a better grain structure, a hammer blow may be used on the pieces in the weld area immediately after the plastic area is congealed.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 6 is an enlarged fragmentary section of a portion of the apparatus illustrated in Fig. 3.

Figure 1:
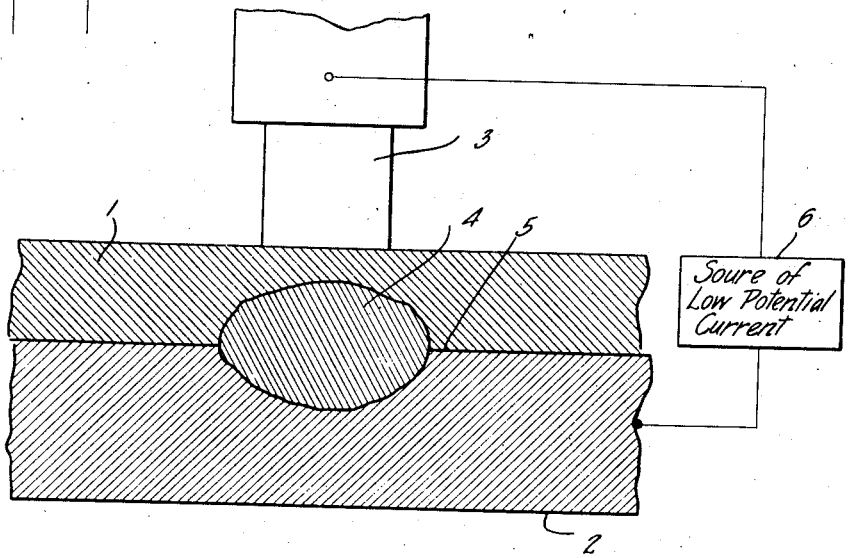
Figure 1 is a schematic diagram to aid in explaining the invention.
Figure 3:
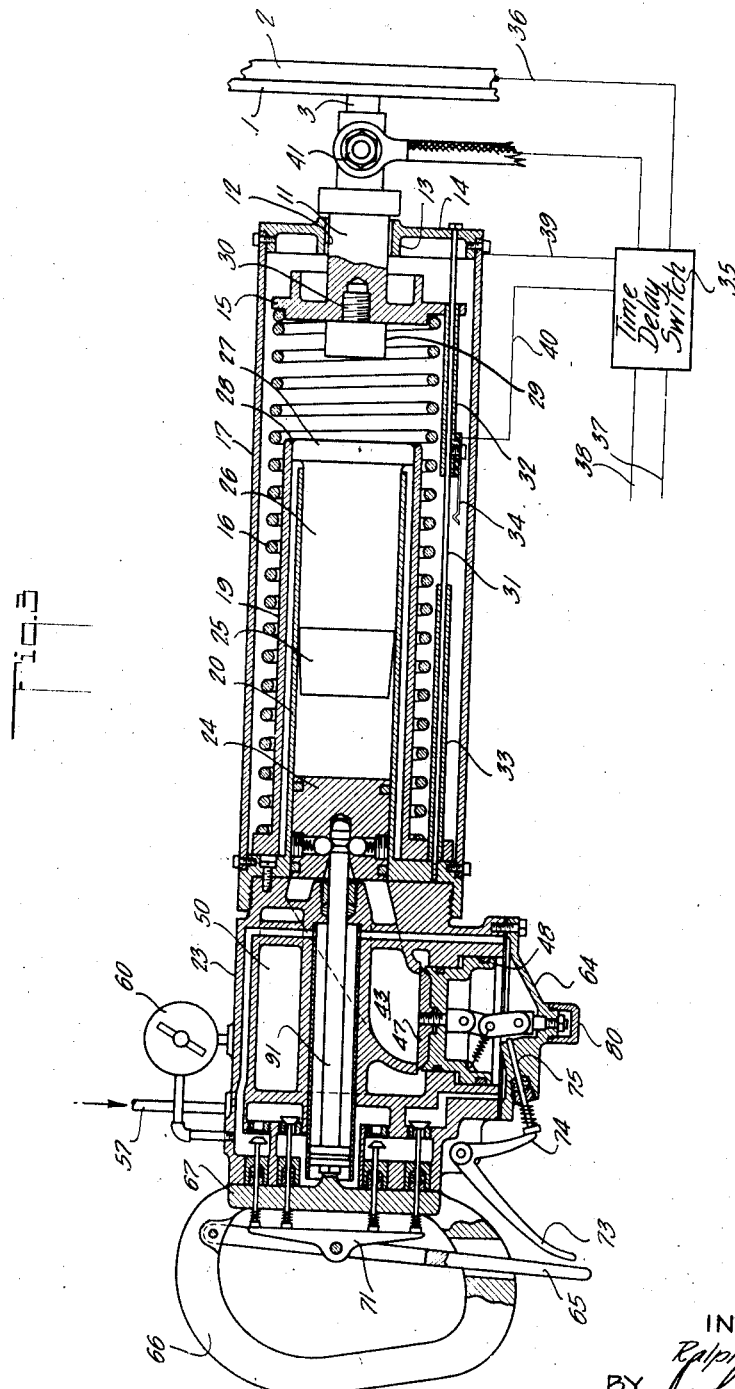
Fig. 3 is a view, mainly in section, of one form of apparatus adapted to be utilized for practicing the invention.

The two pieces to be joined by impact welding in accordance with the invention are illustrated as flat plates 1 and 2 (Figs. 1 and 3). These plates may be of weldable metal, such as steel or iron. In order to obtain a weld, an electrode structure 3 is arranged to be pressed against the piece 1 for conducting a heating current through the contacting surfaces of pieces 1 and 2. The current and resistance which is determined by pressure are of such values to produce sufficient heat to cause a pool 4 of molten or plastic metal to form. This pool is intersected at the contacting surfaces 5. In Fig. 1, a source 6 of low potential heating current is indicated, connected to the electrode structure 3 and to the lower plate 2.

The heating of the metal in this manner is secured by appropriate pressure applied between the pieces 1 and 2 by the structure 3. This pressure is such that during the interval that the heating current flows, sufficient resistance exists between the pieces 1 and 2.

In the cycle employed in this invention, the pressure applied by electrode 3 is gradually increased to a maximum and then released. The current flow is maintained only for an intermediate portion of the period during which pressure is applied. The pressure gradually builds up so as to produce proper admixture of the plastic metal forming pool 4, and is applied with continually greater force even after the current is stopped. This results in an impact weld, for as the pool 4 cools, the pressure ensures intimate union of the pieces 1 and 2 by the aid of the coalesced metal that forms the plastic pool 4.

Furthermore, if desired, at the conclusion of the pressure increasing cycle, a hammer blow may be exerted upon the electrode 3 for further intensive working of the metal to produce the desired grain structure in the weld.

Figure 2:
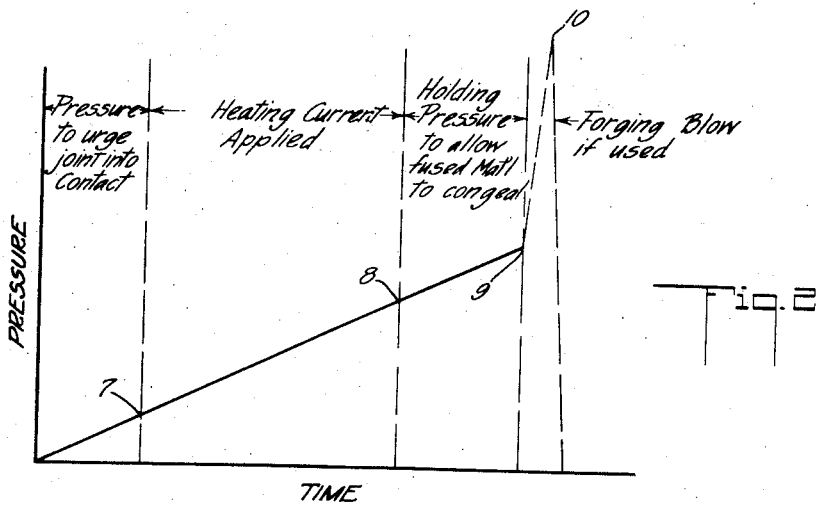
Fig. 2 is a graph illustrating the various steps of the welding process.

This system of welding is indicated graphically in Fig. 2, where the abscissae of the graph represent time; and the ordinates represent pressure as applied between the plates 1 and 2. During the first period, the pressure builds up continuously from a low value to a point corresponding to the ordinate of point 7. At this point the heating current is applied. This heating current is continued until the point 8 is reached. At the same time the pressure is continuously increased, corresponding to the ordinate of the point 8. Thereafter, at the conclusion of the application of the heating current, there is a holding pressure which continuously increases to a value corresponding to the ordinate of point 9. During the application of this holding pressure the metal of pool 4 congeals. At the conclusion of the gradual increase of pressure, a violent hammer blow may be struck, corresponding to a pressure represented by the ordinate of point 10. Immediately after the hammer blow is delivered, the pressure drops to zero.

The time consumed by the entire cycle, as represented by the abscissa of point 10 or point 9 may be very short, of the order of a fraction of a second.

Figure 4:
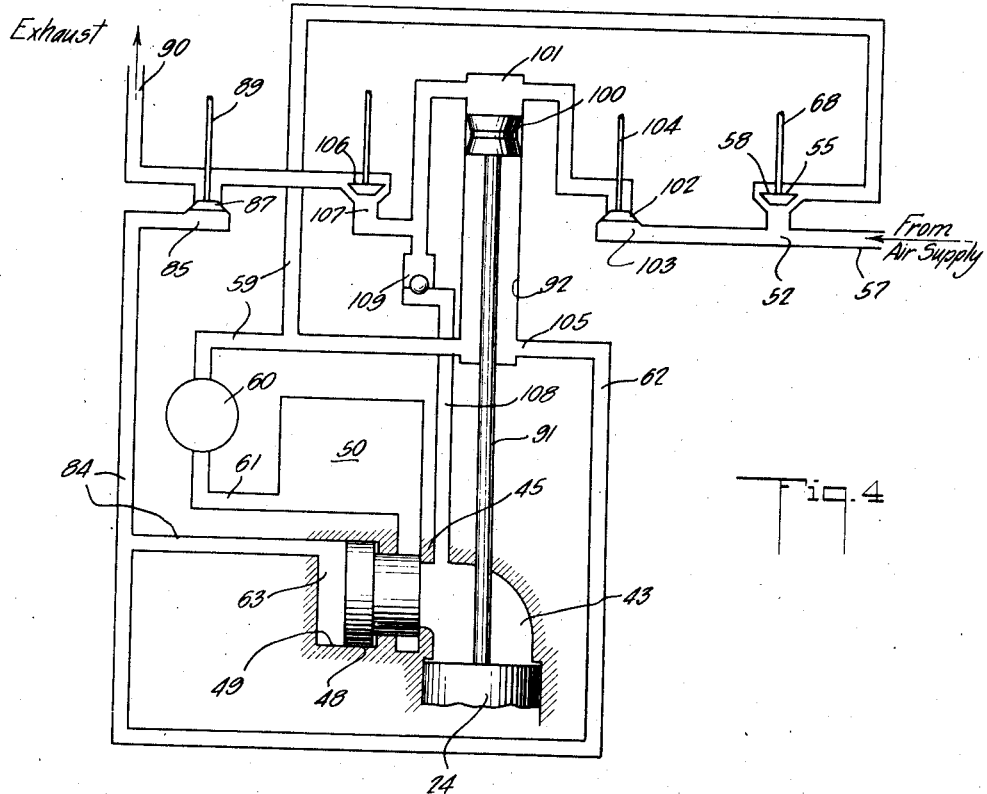
Fig. 4 is a schematic diagram of the apparatus illustrated in Fig. 3.

The apparatus whereby this cycle may be accomplished is illustrated somewhat diagrammatically in Figs. 3, 4 and 6.

The electrode structure 3 in this instance is shown as carried by a member 11 of cylindrical form, guided for axial movement in an aperture 12. This aperture 12 is located in the hub 13 of a cover member 14.

Provisions are made for exerting a gradually increasing pressure upon the member 11 for transmission of that pressure to the electrode structure 3. For this purpose use is made of a compression spring 16 housed in a barrel 17. The cover member 14 has a flange telescoping within the right hand end of the barrel 17, and thus serves as a cap or cover for the right hand end of barrel 17. The barrel 17 and the cover member 14 may be appropriately joined together.

One end of the compression spring 16 is seated on the flange 15, shown in this instance as formed integrally with the member 11. The left hand end of the spring 16 abuts a flange 18 formed on an axially movable hollow sleeve 19. This sleeve 19 is located within the barrel 17, and may be coaxial therewith. It is arranged to be driven toward the right for compressing the spring 16, and thereby increasing the pressure acting upon the member 11.

For causing motion of the sleeve 19, use is made of a cylinder and piston mechanism adapted to operate for example by the aid of compressed air. Thus for example there is a stationary cylinder 20 reaching nearly to the right hand end of the sleeve 19. This cylinder 20 has an integral flange 21 over which telescopes the right hand end of the barrel 17 and to which the barrel 17 may be fastened. The cylinder 20 may be also provided with an internally threaded integral collar 22 for the accommodation of a body member 23 which incorporates the control apparatus, such as valves and their operating mechanism. For the present it is sufficient to note that the cylinder 20 is so arranged that it may accommodate a movable piston 24 located within the cylinder.

Piston 24, upon being urged toward the right under the influence of expanding compressed air, is arranged to strike the end 25 of an impact sustaining member 26. This impact sustaining member 26 is guided for free sliding movement in the right hand end of the cylinder 20. It is joined as by the aid of its end flange 27 to the right hand end of the sleeve 19. This joining may be accomplished for example by an annular welded bead 28.

Movement of the piston 24 toward the right ultimately causes engagement of the piston with the left hand surface of the extension 25; and thereafter the sleeve 19 is carried toward the right, causing compression of the spring 16 and a driving force upon the electrode 3.

The arrangement is furthermore such that if desired, a violent hammer blow may be exerted upon the structure carrying the electrode 3 at the completion of the piston stroke. Thus for example the member 11 may carry an anvil member 29. This anvil 29 may be attached to the left hand end of member 11 as by the aid of the threaded extension 30. The anvil 29 is purposely made easily detachable from member 11, so that different anvils of varying lengths may be substituted. In this way that point during the cycle of travel of the piston 24 when the hammer blow is delivered, can be determined.

As heretofore stated, the gradually increasing pressure upon the electrode 3, is so arranged that at some intermediate interval of the operative movement of the piston 24 an electric current can be passed through pieces 1 and 2 for heating the area to be welded. The period of heating begins a short time after the spring 16 is beginning to compress, and the heating effect is made to last for almost the end of the pressure exertion cycle. As the pressure is increased, there is a corresponding variation in current flow; and since resistance is greatest between the interfaces of pieces 1 and 2, the heating effect is quite well confined to the place where these two pieces are in contact, and under the pressure exerted by the electrode 3.

There is diagrammatically illustrated in Fig. 3 one manner in which the control of the electric heating circuit may be effected. For example, a bar or rod 31 may extend between the cover 14 to flange 21. This bar or rod passes through a sleeve 32 attached to the flange 15 of member 11. Similarly the flange 18 of the tubular member 19 carries a conducting sleeve 33. The sleeve 32 carries a spring contact finger 34. This contact finger is insulated from the sleeve 32 and is in the path of movement of the conducting sleeve 33. Movement of the sleeve 19 toward the right to compress spring 16 causes movement of the conducting member 33 toward the right and ultimately contact is made with the spring finger 34. When this occurs, a control cricuit is completed through the grounded conection 39, connection 40, contact finger 34 and sleeve 33, for causing a time delay switch 35 to close. When this occurs, the main heating circuit is completed from mains 37 and 38 through the switch 35, terminal connection 41, electrode 3, pieces 1 and 2, and connection 36. The time delay switch is so arranged that it maintains this circuit closed for a previously adjusted period to conform with the requirements of the impact welding. Ordinarily, as explained in connection with the graph of Fig. 2, this heating circuit is applied to near the end of the stroke of the piston 24.

By appropriate choice of a source of electrical energy, the interval of heating through the electrode structure 3 is sufficient to cause the formation of a plastic or molten pool 4 (Fig. 1) between the pieces 1 and 2. The period of heating is stopped prior to the ultimate maximum compression of spring 16 so as to cause pressure to be applied during the period of congealing of the plastic or molten material. Also, by permitting the hammer blow to be struck upon the anvil 29 by the flange 27 of the member 26, the last step of applying a forging blow may be accomplished.

The control mechanism for the piston 24 in cylinder 20 is illustrated somewhat diagrammatically in Figs. 3 and 6, and it is shown in still more diagrammatic form in Fig. 4.

The body 23 is provided at one end with an annular port 41 communicating with the left hand or open end of the cylinder 20. This port 41 is in communication, as by the aid of aperture 42, with an inlet chamber 43. The aperture 42 extends through a wall 44 formed adjacent the right hand portion of the body 23, for the accommodation of various passages or ports for purposes hereinafter to be described.

The inlet space 43 is defined by wall 45 forming a flat valve seat 46. In the inactive or quiescent position, this inlet space 43 is closed against the entry of air under pressure, by an appropriate valve closure structure.

The closure member for the valve seat 46 is shown in this instance as a yielding disk 47, having its edge in contact with the seat 46. The closure member 47 is mounted in any appropriate manner upon the end of a movable valve operating piston member 48. This piston member is slidable in appropriate guiding cylinder walls 49 formed in the body 23. In the inactive position, air under pressure is conducted to the lower side of the piston structure 48 to keep the valve closure 47 seated. However, by appropriate mechanism this piston 48 may be moved downwardly so as to connect the inlet chamber 43 with a reservoir space 50. This reservoir space is adapted to be filled with compressed air at a definite pressure.

Accordingly when the valve closure 47 moves downwardly away from its seat, the potential energy of the compressed air in space 50 is effective through space 43, aperture 42 and port 41, to urge the piston 24 toward the right, and thereby to convert the potential energy into kinetic energy of the moving piston 24.

The reservoir 50 is shown in this instance as being defined by a wall 51 and by a guiding hub 86 extending axially to the piston 24.

The passage of air into the space 50 and into the lower side of the piston 48 which carries the closure member 47, is effected through a valve port 52. This valve port may be formed within a valve member 53 threaded in a wall 54 integral with the body member 23. In the inactive position this valve port 52 is opened but may be closed by a valve closure 55.

Air under pressure is lead to a space 56 formed in body 23, and leading to the right hand side of the port 52, as by the aid of a conduit 57. This conduit 57 may be connected, as by flexible hose, to any appropriate source of air pressure, such as an air compressor system or tank. The air passes from space 56 through port 52 and into a space 58. From this space there are two paths in parallel for the air; one path is by way of the connection 59 to a pressure reducer valve 60. From the pressure reducer valve there is a connection 61 leading directly to the reservoir 50. The air in reservoir 50 is thus kept at a desired pressure prior to the opening of the valve closure 47.

Air is also permitted to pass from space 58 to a passage 62 formed in the wall of member 23, as well as in the wall 44. This passageway conducts air to the space 63 beneath the piston 48.

In order that this space be maintained closed, a cover member 64 is provided, attached to the body 23.

By simultaneous manipulation of valve 55 and piston 48, the flow of air as just described can be interrupted, and the reservoir 50 can be opened. To open the reservoir, the space 63 is exhausted, and the valve closure 47 then moved to open position. Thereupon the piston 24 is urged by air pressure inwardly of the cylinder 20. A diagrammatic representation of mechanism to accomplish this result includes a manually operated lever 65. This lever is shown as pivoted near the upper end of a handle 66 attached to the cover member 67 for the left hand end of the body 23. Movement of the lever 65 in a counterclockwise direction causes substantially simultaneous opening of the valve closure 47 and closing of the valve port 52. For this purpose the valve 55 may be provided with a stem 68 projecting through the cover 67. This stem 68 may be appropriately arranged to slide through a suitable packing gland structure 69. Its left hand end may terminate in an enlarged head 70 adapted to be contacted by an actuator 71. This actuator 71 is pivotally mounted intermediate the lever 65. A coil spring 72 may if desired be interposed between the cover 67 and the head 70 for normally urging the valve stem 68 toward open position. The actuator 71 is caused to depress the stem 68 and closes the valve 52. Simultaneously the lower end of lever 65 engages one arm of a bell crank lever 73. This bell crank lever may be appropriately pivoted on the body 23. The short arm 74 of the lever 73 is arranged to push a push rod 75 projecting through the cover 64.

For this purpose the push rod 75 may be appropriately guided and sealed against escape of air, in cover 64. The inner end of the push rod 75 is arranged to break a toggle mechanism connected between the cover 64 and the piston 48. This toggle mechanism includes a clevis 76 which also serves to hold the closure disk 47 in place on the piston 48. The toggle also includes a clevis 77 attached to the cover 64. The integral stud 78 attached to the clevis 77 passes through the cover 64 and may serve as a fastening means for the clevis, as by the aid of the nut 79. A threaded cap 80 may be provided for covering the projecting stud 78.

Joining the clevises 76 and 77 are a pair of toggle links 81 and 82. Normally the air pressure in chamber 63 serves to hold the toggle mechanism in substantially the straight position illustrated in Fig. 3. A tension spring 83 may be utilized to assist in urging the toggle mechanism to this position. However, when the bell crank lever 73 is rotated in a counterclockwise direction the push rod 75 operates on link 82 and breaks the toggle, depressing the closure disk 47 to open position. The pressure of air escaping from the reservoir 50 past the disk 47 keeps the valve open until the completion of the welding cycle.

In order to ensure that air can exhaust from the space 63 so that there may be no interference with the opening of the valve closure, an exhaust passage 84 is provided, leading from the space 63. This exhaust passage leads into a space 85, connected to atmosphere. This space 85 is formed between the walls 51 and 54. It is controlled by an exhaust valve closure 87 cooperating with a valve port forming member 88 in wall 54. The stem 89 for closure 87 is guided through the cover member 67 in the same manner as stem 68 for valve 52. It is likewise adapted to be depressed by the actuator 71 upon movement toward the right of the control lever 65. Accordingly when control lever 65 is moved in a counterclockwise direction, the exhaust valve 87 opens, and air from space 63 is exhausted through the exhaust passage 90.

Upon release of the lever 65, the valve stem springs such as spring 72, operate on actuator 71 to return the mechanism to the position shown in Fig. 3. In this position air can again enter into the reservoir 50 past valve 52, and through the regulator valve 60. Air can also pass through passageway 62 to the lower side of the piston 48, urging the closure 47 to its closed position, and straightening the toggle mechanism.

As thus far described, the piston 24 at the conclusion of the cycle might be retained in its extreme right hand position in cylinder 20. Provisions are made, however, for returning the piston 24 to the starting position illustrated, upon release of lever 65. For this purpose, automatic mechanism is provided operating by air pressure, to move the piston 24 toward the left.

The mechanism for accomplishing this purpose includes a stem 91 which projects through a cylinder sleeve 92 fastened inside of the hub 86. This stem 91 is detachably connected to the piston 24. For this purpose the piston 24 has an axial aperture 93 in which the rounded end of the stem 91 may project. The stem 91 furthermore has a groove 94 formed by slanting walls and adapted to cooperate with a plurality of spring pressed balls 95. These balls 95 are guided in appropriate radial apertures in the piston 24, and are urged inwardly into groove 94 for detachably connecting the stem 91 to piston 29. This is accomplished by the aid of springs 96. These springs are held in compressed position by the headless screws 97 threaded into the outer portions of end radial apertures.

Upon release of air from reservoir 50 through the port 41 to move the piston 24 toward the right, this piston 24 moves sufficiently violently so as to release the balls 95 and piston 24 is free to travel without restraint in the cylinder 20.

However, the stem 91 is guided for axial movement and is intended to follow the piston 24 and to be urged into engagement with the piston. For this purpose the stem 91 is shown as guided through a packing gland structure 98 in a boss 99 formed concentrically with the hub 86. At its left hand end the stem 91 carries an auxiliary piston structure 100 adapted to slide within the cylinder 92. The piston 100 is adapted to be urged toward the right to follow the piston 24 by air pressure in space 101. Compressed air can enter space 101 past a valve closure 102 of similar construction to the valves already described. This valve closure 102 operates against a seat formed in valve member 103 and is normally closed in the inactive position. However, when the actuator 71 depresses the stem 104 of closure 102, compressed air is free to pass into space 101, and the piston 100 moves toward the right. This occurs substantially simultaneously with the closing of valve closure 52 and the opening of the valve closure 47. Accordingly, the stem 91 is urged downwardly by air pressure to be re-engaged by the balls 95. The right hand end of the stem 91 is rounded in order to ensure that it can act as a cam to spread the balls 95. Furthermore, the aperture 93 in piston 24 has a flared portion 114 to assist in guiding the rounded end of stem 91 into the aperture.

Upon completion of the welding operation, the actuator 71 may be released. This causes the entry of air within the cylinder 92 in the space to the right of the piston 100 to move the piston 100 to the extreme left hand position indicated. For this purpose the cylinder 92 has one or more openings 105 communicating with the air passage 62. Accordingly when passage 62 is again connected to the inlet conduit 57, past the closure 55, the piston 100 and its stem 91 are urged toward the left, and the main piston 24 is carried along with the stem 91.

Exhaust passages are also provided for exhausting the space from one or the other side of the auxiliary piston 100. Thus in the inactive position shown in Fig. 3, the space 101 is shown as vented past the exhaust valve closure 106 which is open when the apparatus is inactive. This valve closure cooperates with valve structure 107, and is urged to its seat when the lever 65 is moved to initiate the welding cycle. Since valve closure 102 simultaneously opens, air pressure is then effective to urge the auxiliary piston 100 toward the right.

Similarly, when the lever 65 is moved to initiate the welding cycle, the exhaust valve closure 87 is opened, and this serves simultaneously to exhaust air from the right hand side of the auxiliary piston 100, permitting free movement of this piston. This is effective through the ports 105, and passage 62. As soon as lever 65 is released, the exhaust valve 107 opens, and exhaust valve 87 is closed; and at the same time, compressed air passes into cylinder 92 to move the piston 100 toward the left.

Provisions may also be made to ensure that the air in cylinder 20 on the left hand side of the piston 24 will be exhausted when the lever 65 is released at the conclusion of the welding cycle, thereby removing any resistance to the return of the piston. For this purpose, as illustrated diagrammatically in Fig. 4, there is provided a passageway 108 leading from the space 43 to the exhaust valve 107. This passageway may be controlled by a ball check valve diagrammatically illustrated at 109, which permits passage of air only outwardly from the space 43.

The operation of the welding mechanism may now be summarized. In the position indicated in Fig. 3, the reservoir 50 is filled with air and is kept sealed against escape past the valve closure 47. Furthermore, air pressure is effective against the right hand side of the auxiliary piston 100, holding the main piston 24 in its inactive position.

Upon depressing the lever 65, the valve closure 47 is depressed to the open position by the aid of push rod 75 operating on the toggle mechanism. At the same time air is exhausted from the space 63 and air is permitted to enter the space 101. Accordingly air is effective immediately to urge the piston 24 by compressed air passing through port 41, to cause piston 24 to strike the extension 25. Thereafter the kinetic energy of the piston 24, imparted to it by the expanding air from reservoir 50, is converted into the work of compressing spring 16. The auxiliary piston 101 and stem 91 follow this movement.

For this condition, valve closures 55 and 106 are urged to the closed position, shutting off air supply to this reservoir 50 as well as to the lower side of the valve piston 48 and the right hand side of the auxiliary piston 100. The valve closure 106 is also urged to closed position, and valve closure 102 is urged to open position, supplying air to the left hand side of the auxiliary piston 100.

Upon release of the lever 65, the valve closure 47 is returned to the position illustrated in Figs. 3, 4 and 6. The reservoir 50 promptly becomes filled with compressed air at the desired pressure, and the auxiliary piston 100 is moved toward the left to return main piston 24 to the inactive position indicated. Air is also passed into space 63 to cause valve closure 47 to seal the reservoir 50.

In the travel of the piston 24, the extension 25 is engaged and the spring 16 is gradually compressed. At the conclusion of the stroke the anvil 29 may be struck, if desired, to complete the welding operation by forging. At an intermediate point, the circuit for control of the time delay switch 35 is completed and heating current is permitted to pass for a short interval.

Figure 5:
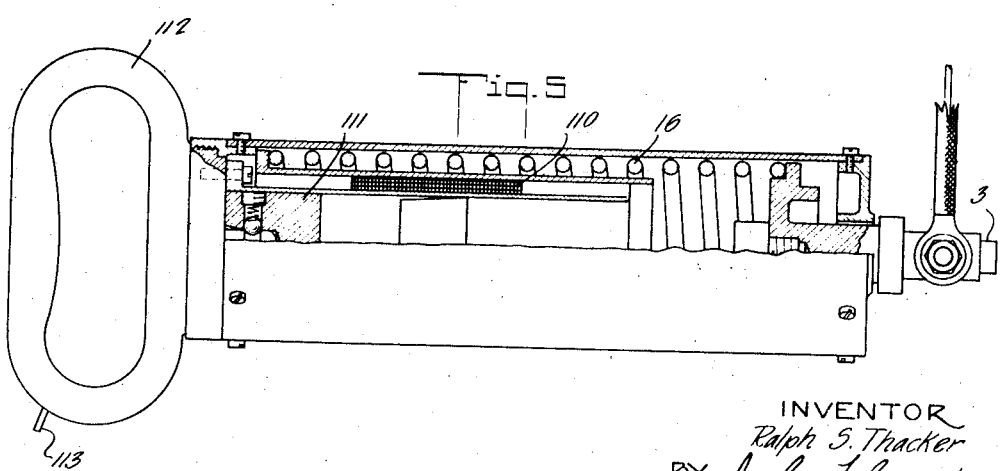
Fig. 5 is a view similar to Fig. 3 of a modified form of the apparatus.

It is not essential that the motive power be compressed air. It is feasible instead to provide an electromagnet coil 110 (Fig. 5) for operating upon the magnetic piston 111 to effect the same result. A similar structure may be used to retract the piston. In this instance the handle 112 of the device may be provided with a switch for controlling the current to the coil 110, as by the aid of an operating member 113. In other respects the apparatus may be similar to that described, switches in general being utilized in place of valves.

What I claim is:

1. The process of electrically welding contacting metallic elements together, which comprises increasing the pressure between the two elements in a continuous manner between a low value and a high value, and passing an electric current between the elements for an interval beginning substantially above the low pressure and ending substantially below the high pressure, said current producing a yelding temperature at the locality of the contact.

2. The process of electrically welding contacting metallic elements together, which comprises increasing the pressure between the two elements in a continuous manner between a low value and a high value, passing an electric current between the elements for an interval beginning substantially above the low pressure and ending substantially below the high pressure, said current producing a welding temperature at the locality of the contact, and suddenly increasing the pressure beyond said high value.

3. The process of electrically welding contacting metallic elements together, which comprises pressing an electrode against one of the elements to urge the elements toward each other, increasing the pressure on the electrode in a continuous manner, so that the pressure increases continuously between a low and a high value, and passing an electric current through said electrode and said elements for an interval beginning substantially above the initial pressure and ending substantially below the high pressure, said current producing a welding temperature at the locality of the contact.

4. The process of electrically welding contacting metallic elements together, which comprises pressing an electrode against one of the elements to urge the elements toward each other, increasing the pressure on the electrode in a continuous manner, so that the pressure increases continuously between a low and a high value, passing an electric current through said electrode and said elements for an interval beginning substantially above the initial pressure and ending substantially below the high pressure, said current producing a welding temperature at the locality of the contact, and suddenly increasing the pressure beyond said high value.

5. The process of electrically welding contacting metallic elements together, which comprises expending a limited amount of mechanical energy upon a resilient medium that transmits a pressure upon the elements, in such manner as continuously to increase the pressure thus transmitted, to an upper limit and passing an electric current for an interval beginning at an instant when the pressure is substantially above the beginning pressure, and ending at an instant when the pressure is substantially below the upper limit, said current producing a welding temperature at the locality of the contact.

RALPH S. THACKER.